April 23, 1929.  L. J. McKONE  1,710,485
PISTON RING
Filed Feb. 9, 1927
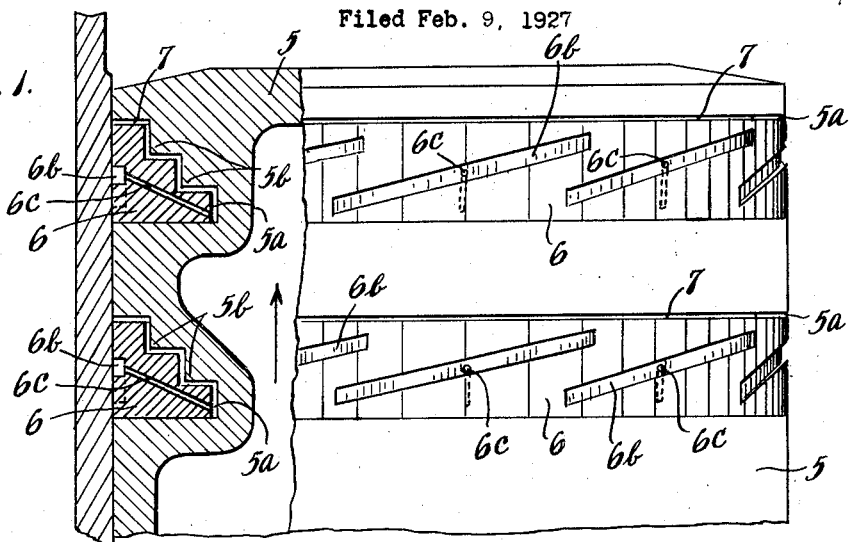
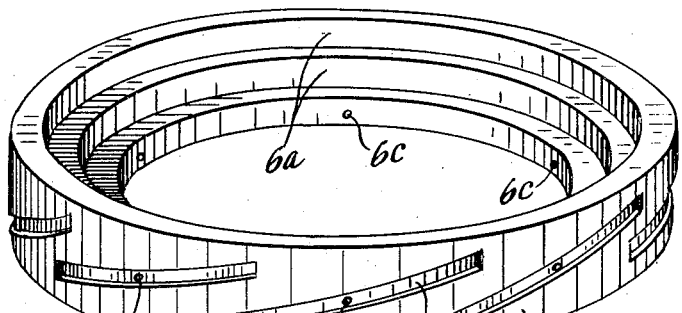
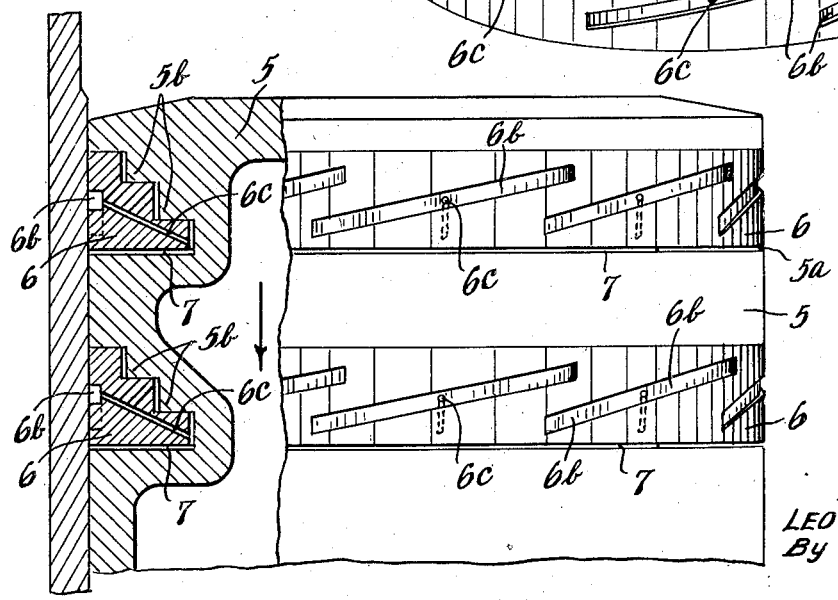
Inventor
LEO J. McKONE.
By his Attorneys Patented Apr. 23, 1929.

1,710,485

UNITED STATES PATENT OFFICE.

LEO J. McKONE, OF MINNEAPOLIS, MINNESOTA.

PISTON RING.

Application filed February 9, 1927. Serial No. 166,954.

This invention relates to a piston ring and while the invention is particularly designed for use in the piston of an automobile engine, it is capable of application with other types of pistons. In modern high speed automobile engines, difficulty is experienced in maintaining a proper film of oil between the piston rings and the cylinder wall. Unless the film of oil is maintained between these parts, undue friction occurs on the cylinder wall and the ring and wall become heated so that the wall is abraded and the cylinder thus damaged and given an out-of-round shape. If wide rings are used, it has been difficult to properly supply oil to the surface thereof and it has become more or less of a common practice to use narrow oil rings in the pistons. The oil film, however, breaks down on the narrow rings and serious damage to the cylinder wall and rings result.

It is an object of this invention, therefore, to provide a ring which can be made of considerable width and to which the oil can effectively be distributed.

It is a further object of the invention to provide a ring which can be made of considerable width, which ring has recesses in its wearing surface, with means for supplying oil to said surface through said recesses.

It is still another object of the invention to provide a ring which has a stepped formation on its inner side fitting a like formation in the piston ring groove and which has recesses on its wearing surface in communication with said steps on its inner side.

It is still another object of the invention to provide a piston and ring structure in which the piston has ring grooves with stepped formation in which fit stepped rings so that a recess or passage is formed between the rings and piston, said ring having grooves in its outer surface connected by passages with its stepped surface.

These and other objects and advantages of the invention will be fully set forth in the following description made in connection with the accompanying drawings, in which like reference characters refer to similar parts throughout the several views and in which:—

Fig. 1 is a view partly in radial section and partly in side elevation showing a portion of the piston and cylinder wall with the rings therein;

Fig. 2 is a view similar to Fig. 1 showing the rings in the piston in another position; and Fig. 3 is a perspective view of the ring used.

Referring to the drawings, a piston 5 is shown such as now commonly used in an internal combustion or automobile engine. Said piston has ring grooves 5ª formed therein and in the embodiment of the invention illustrated these grooves are of stepped formation or formed with successive angular portions 5ᵇ. While the angle of these portions might be varied, in the embodiment of the invention illustrated they are shown as right angular. The grooves 5ª have rings 6 disposed therein and it will be seen that these rings are formed on their inner side with a plurality of steps or with recesses 6ª corresponding in number and shape with the recesses 5ᵇ of the grooves 5ª, the recesses 6ª thus being of right angular shape in cross section. The rings 6 are of a size, however, to leave an opening or recess 7 between their inner sides and the surface of the ring grooves. The ring 6 is also provided on its outer surface with a plurality of slots 6ᵇ and while these slots may be of various shapes, in the embodiment of the invention illustrated they are shown as substantially rectangular in shape in cross section. The slot 6ᵇ as clearly shown in the drawings, extend in a direction inclined to the top and bottom surface of the ring and it will be seen that said grooves overlap at their ends. Comparatively small holes 6ᶜ extend from the bottom of the grooves 6ᵇ at an intermediate point therein to the inner side of said ring.

When the engine is operating and the piston is moving upwardly in the cylinder, the ring will occupy the position shown in Fig. 1. It will be understood that as usual the ring is under some tension to expand and engage the cylinder wall although this tension must be of such small degree as to permit the movement of the ring transversely of the groove in the movements of said piston. With the described structure oil will be forced into the recess between the piston 5 and the ring 6 and this oil will pass through the passage 6ᶜ into the grooves 6ᵇ and will be distributed on the cylinder wall and the ring wearing surface. This action is as follows:—

When the piston moves upward on the compression stroke, the ring will be in the position shown in Fig. 1. The pressure above the piston at this time forces the oil along the side of the piston above the ring and into the recess 7. This oil being under pressure of approximately 100 pounds per square inch, will be forced through the passages 6ᶜ into the grooves 6ᵇ and will be distributed over the wearing surface of the ring. The same action will take place when the piston moves upward on the exhaust stroke. At this time there is approximately a pressure of 40 pounds per square inch in the cylinder. The ring will also usually assume the position shown in Fig. 1 just after the expansion in the cylinder as the high pressure in the cylinder which is at this time usually over 400 pounds per square inch, will force the ring to its lowest position in the piston. The oil will also at this time be forced into the recess 7 and through the passages 6ᶜ. When the piston moves downwardly in the intake stroke and possibly during the latter part of the power stroke, the ring will take the position shown in Fig. 2. As shown in Fig. 2, the upper surface of the steps on the ring and piston are then in contact. The inner end of the passages 6ᶜ will thus be sealed from the upper end of the piston so that oil cannot be sucked from the grooves 6ᵇ through the passages 6ᶜ. If it were not for this seal, this action would take place. The ring thus shifts its position with the movement of the piston and oil is regularly supplied to the grooves. The wearing surface of the ring is thus effectively supplied with oil and the film of oil between the ring and the cylinder wall is continuously maintained.

From the above description it is seen that applicant has provided a very simple and efficient structure of piston ring and one which effectively maintains the proper lubrication. The ring is of simple construction and easily made and installed. The device has been given long tests in actual practice and has proven to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. A piston ring having a plurality of steps on its inner side adapted to fit corresponding steps on the piston so as to leave a passage between said ring and piston, said ring having a plurality of spaced circumferential grooves formed in its outer surface and passages leading from said grooves to the inner side of said ring.

2. A piston ring having its inner side formed with a plurality of stepped recesses of right angular shape in radial cross section, said ring having a plurality of spaced circumferential grooves on its outer surface, and a passage leading from the bottom of each groove to the inner side of said ring, said groove being inclined to the top and bottom surfaces of said ring and overlapping at their ends.

3. A piston and ring structure comprising a piston having an imperforate wall with a stepped ring groove therein, said groove being narrowest at its upper portion, a ring disposed in said groove and stepped at its inner portion to fit said groove, said ring thus being widest at its lower portion, said ring being thinner than the depth of said groove so as to leave a passage between the inner side of said ring and the inner wall of said groove, said piston thus acting to seal said passage by vertical reciprocation of said ring in the movements of said piston, said ring having a passage leading from its outer surface to its inner surface adjacent the bottom thereof.

In testimony whereof I affix my signature.

LEO J. McKONE.